(12) United States Patent
Healy et al.

(10) Patent No.: US 11,447,234 B2
(45) Date of Patent: Sep. 20, 2022

(54) AIRCRAFT WING AND FLIGHT CONTROL SURFACE

(71) Applicant: AIRBUS OPERATIONS LIMITED, Bristol (GB)

(72) Inventors: Daren Healy, Bristol (GB); Laurence Queeney, Bristol (GB)

(73) Assignee: Airbus Operations Limited, Bristol (GB)

( * ) Notice: Subject to any disclaimer, the term of this patent is extended or adjusted under 35 U.S.C. 154(b) by 276 days.

(21) Appl. No.: 16/571,618

(22) Filed: Sep. 16, 2019

(65) Prior Publication Data

US 2020/0086973 A1 Mar. 19, 2020

(30) Foreign Application Priority Data

Sep. 17, 2018 (GB) ...................................... 1815106

(51) Int. Cl.
*B64C 9/04* (2006.01)
*B64C 9/00* (2006.01)
*B64C 9/02* (2006.01)
*B64C 3/10* (2006.01)
*B64C 3/40* (2006.01)
*B64C 13/38* (2006.01)

(52) U.S. Cl.
CPC .................. *B64C 9/02* (2013.01); *B64C 3/10* (2013.01); *B64C 3/40* (2013.01); *B64C 9/04* (2013.01); *B64C 13/38* (2013.01); *B64C 2009/005* (2013.01)

(58) Field of Classification Search
CPC .... B64C 9/02; B64C 9/04; B64C 9/16; B64C 9/18; B64C 9/20; B64C 9/22; B64C 9/24; B64C 9/26; B64C 2009/005
See application file for complete search history.

(56) References Cited

U.S. PATENT DOCUMENTS 3,874,617 A * 4/1975 Johnson .................... B64C 9/16
244/216
4,892,274 A 1/1990 Pohl et al.
4,995,575 A 2/1991 Stephenson
(Continued)

FOREIGN PATENT DOCUMENTS

EP 0 052 240 5/1982

OTHER PUBLICATIONS

Combined Search and Examination Report for GB Application No. 1815106.8 dated Mar. 1, 2019, 6 pages.

*Primary Examiner* — Nicholas McFall
*Assistant Examiner* — Terri L Filosi
(74) *Attorney, Agent, or Firm* — Nixon & Vanderhye P.C.

(57) ABSTRACT

A flight control surface with an actuator with an aerodynamic fairing for a swept aircraft wing. The swept aircraft wing includes a movable flight control surface with a hinge line non-perpendicular to the line of flight of the aircraft, and an actuator arm configured to actuate the flight control surface. The actuator arm includes a longitudinal axis substantially aligned with the line of flight, the actuator arm extending at least partially from an outer surface of the aircraft wing, and a fairing arranged on the outer surface of the aircraft wing to at least partially cover the actuator arm. Aligning the actuator arm with the line of flight of the aircraft may allow for an improved fairing to be provided.

15 Claims, 4 Drawing Sheets

(56) References Cited

U.S. PATENT DOCUMENTS

| | | | |
|---|---|---|---|
| 5,161,757 A | 11/1992 | Large | |
| 2009/0134281 A1 | 5/2009 | Engelbrecht et al. | |
| 2010/0044511 A1* | 2/2010 | Coulter | B64C 3/187 244/123.1 |
| 2012/0091283 A1 | 4/2012 | Uchida et al. | |
| 2013/0204470 A1 | 8/2013 | Luckner et al. | |
| 2015/0267793 A1 | 9/2015 | Bernard | |
| 2017/0283041 A1 | 10/2017 | Hauber et al. | |
| 2018/0172178 A1* | 6/2018 | Artoni | B64C 13/42 |
| 2018/0362147 A1* | 12/2018 | Huynh | B64C 13/16 |
| 2020/0079497 A1* | 3/2020 | Huynh | B64C 13/42 |

* cited by examiner

AIRCRAFT WING AND FLIGHT CONTROL SURFACE

RELATED APPLICATION

This application claims priority to United Kingdom Patent Application GB 1815106.8 filed Sep. 17, 2018, the entirety of which is incorporated by reference.

BACKGROUND OF THE INVENTION

The present invention concerns aircraft wings. More particularly, but not exclusively, this invention concerns flight control surfaces on aircraft wings, and the provision of actuators to position the flight control surfaces.

Flight control surfaces may be located at both the front edge and trailing edge of an aircraft wing. On a swept wing, where either the front edge or trailing edge of the aircraft wing is non-perpendicular to the line of flight of the aircraft, this may mean that the flight control surface has a hinge line around which the flight control surface may move relative to the wing, which is also non-perpendicular to the line of flight of the aircraft. Typically, when providing an actuator for moving a flight control surface, the actuator is provided such that the longitudinal axis of the actuator is perpendicular to the hinge line of the flight control surface. This means the actuator may operate in a simple, planar way, with movement of the actuator restricted to a single plane. Often, particularly when a flight control surface is located at the trailing edge of a wing, the actuator extends from within the upper or lower wing skin of the aircraft wing, such that it is necessary to provide a fairing to cover the actuator. As the hinge line of the flight control surface is non-perpendicular to the line of flight of the aircraft, and the longitudinal axis of the actuator is perpendicular to the hinge line, this results in the longitudinal axis of the actuator being non-parallel with the line of flight of the aircraft. Therefore, the size of the fairing covering the actuator is required to be significant, and may reduce the aerodynamic efficiency of the aircraft wing.

The present invention seeks to mitigate the above-mentioned problems. Alternatively or additionally, the present invention seeks to provide an improved aircraft and aircraft wing.

SUMMARY OF THE INVENTION

The present invention provides an aircraft comprising a swept aircraft wing, the aircraft wing comprising a movable flight control surface with a hinge line non-perpendicular to the line of flight of the aircraft, and an actuator arm configured to actuate the flight control surface, wherein the actuator arm comprises a longitudinal axis substantially aligned with the line of flight, the actuator arm extending at least partially from an outer surface of the aircraft wing, and a fairing arranged on the outer surface of the aircraft wing to at least partially cover the actuator arm.

By providing an actuator arm which is substantially aligned with the line of flight, the size of the fairing may be reduced compared to the size of a fairing which was arranged to cover an actuator arm which was non-aligned with the line of flight. In particular, the cross sectional area of the fairing which is exposed to airflow in a head on, line of flight direction, may be reduced. For example, the size of the fairing may be less than a fairing provided for an actuator arm which is perpendicular to the hinge line of the flight control surface, as in many conventional arrangements. Therefore, the present invention may provide improved aerodynamic properties of an aircraft wing. The connection arrangement between the actuator arm and the flight control surface may be more complex than in conventional, prior art, arrangements, which teach an actuator which moves in a single plane of motion. However, the improved aerodynamic performance of the aircraft wing with a smaller fairing may compensate for this increased complexity.

The swept aircraft wing may comprise a swept leading edge. The swept aircraft wing may comprise a swept trailing edge. The swept aircraft wing may comprise a swept leading edge and a swept trailing edge. The sweep angles of the leading edge and the trailing edge may be the same or different. The sweep angles of the leading edge and trailing edge may lie in the range from any of 5, 10, 15, 20, 25, 30 degrees to any of 35, 40, 45, 55, 60, 65, 70 degrees. The hinge line may be aligned parallel with the sweep angle of the swept leading edge or swept trailing edge.

The actuator arm may be arranged to allow non-planar movement with respect to the flight control surface. Non-planar movement is the movement of the actuator in at least a first and second plane. The actuator arm may comprise a first connection to a main body portion of the aircraft wing, for example part of a wing box, a spar, rib, or stringer. The actuator arm may comprise a second connection to the flight control surface. The actuator arm may comprise a longitudinal axis and movement of the actuator arm in the first and/or second plane may comprise the deviation from the longitudinal axis up to ±5 degrees, ±10 degrees, or ±15 degrees. The first connection and/or second connection may allow rotary movement in a first plane and second plane, for example, up and down, and side to side. The first connection and/or second connection may restrict or prevent rotary movement around a longitudinal axis of the actuator arm. One or both of the first and second connections may comprise a pivotal connection. Such pivotal connection may facilitate rotary movement. The actuator arm may therefore be pivotally attached to the main body portion of the aircraft wing. The actuator arm may therefore be pivotally attached to the flight control surface. Such pivotal attachment may be provided by a ball joint or a bolt-and-pin arrangement, for example.

The actuator arm may be connected to an actuator control unit. The actuator control unit may be located remotely to/physically away from the actuator arm, and linked only by one or more control elements. The actuator control unit may be fully located within the aircraft wing, such that no fairing is required to cover the actuator control unit. Separating the actuator arm and the actuator control unit may enable a smaller fairing to be used than if the actuator arm and the actuator control unit are a single unit, thus potentially providing an aerodynamic advantage to the wing. The control elements may be hydraulic or pneumatic pipes, or electrical wiring, depending on how the actuator arm is driven. The actuator arm may be driven hydraulically, pneumatically, or electrically.

The flight control surface may extend from the leading edge or trailing edge of the aircraft wing. The flight control surface may be a flap, aileron, flaperon, or any other flight control surface used on an aircraft wing, as will be appreciated by the skilled person. The actuator arm may be arranged to rotate and/or extend the flight control surface about or from the hinge line, for example the flight control surface may be a plain flap, a split flap, a slotted flap, a Fowler flap, or any other flight control surface as would be understood by a skilled person.

According to a second aspect, the invention provides a swept aircraft wing, the aircraft wing comprising a movable flight control surface with a hinge line non-perpendicular to the line of flight of the aircraft, and an actuator arm configured to actuate the flight control surface, wherein the actuator arm comprises a longitudinal axis substantially aligned with the line of flight, the actuator arm extending at least partially from an outer surface of the aircraft wing, and a fairing arranged on the outer surface of the aircraft wing to at least partially cover the actuator arm.

According to a third aspect, the invention provides an aircraft comprising an aircraft wing, the aircraft wing comprising a flight control surface arranged for movement around a swept hinge line, an actuator arranged to move the flight control surface around the swept hinge line, wherein the actuator comprises a longitudinal axis which is non-perpendicular to the swept hinge line, and approximately parallel to the line of flight of the aircraft, at least part of the actuator extending from an aerodynamic surface of the wing and being covered by a fairing.

According to a fourth aspect, the invention provides a method of actuating a flight control surface on an aircraft according to the first aspect of the invention, the method comprising the step of simultaneously moving the actuator arm in a first plane and a second plane.

The aircraft may be a passenger aircraft, such as a commercial passenger aircraft operated by an airline. The passenger aircraft may include a passenger cabin having rows and columns of seat units for passengers. The aircraft may have a capacity of at least 20, at least 50 passengers, or more than 50 passengers. The aircraft may be a powered aircraft, including an engine(s) for propelling the aircraft in flight and on the ground. The aircraft may include wing-mounted engines, such as underwing, engines.

It will of course be appreciated that features described in relation to one aspect of the present invention may be incorporated into other aspects of the present invention. For example, the method of the invention may incorporate any of the features described with reference to the apparatus of the invention and vice versa.

The term 'or' shall be interpreted as 'and/or' unless the context requires otherwise.

DESCRIPTION OF THE DRAWINGS

Embodiments of the present invention will now be described by way of example only with reference to the accompanying schematic drawings of which.

DETAILED DESCRIPTION

Figure 1:
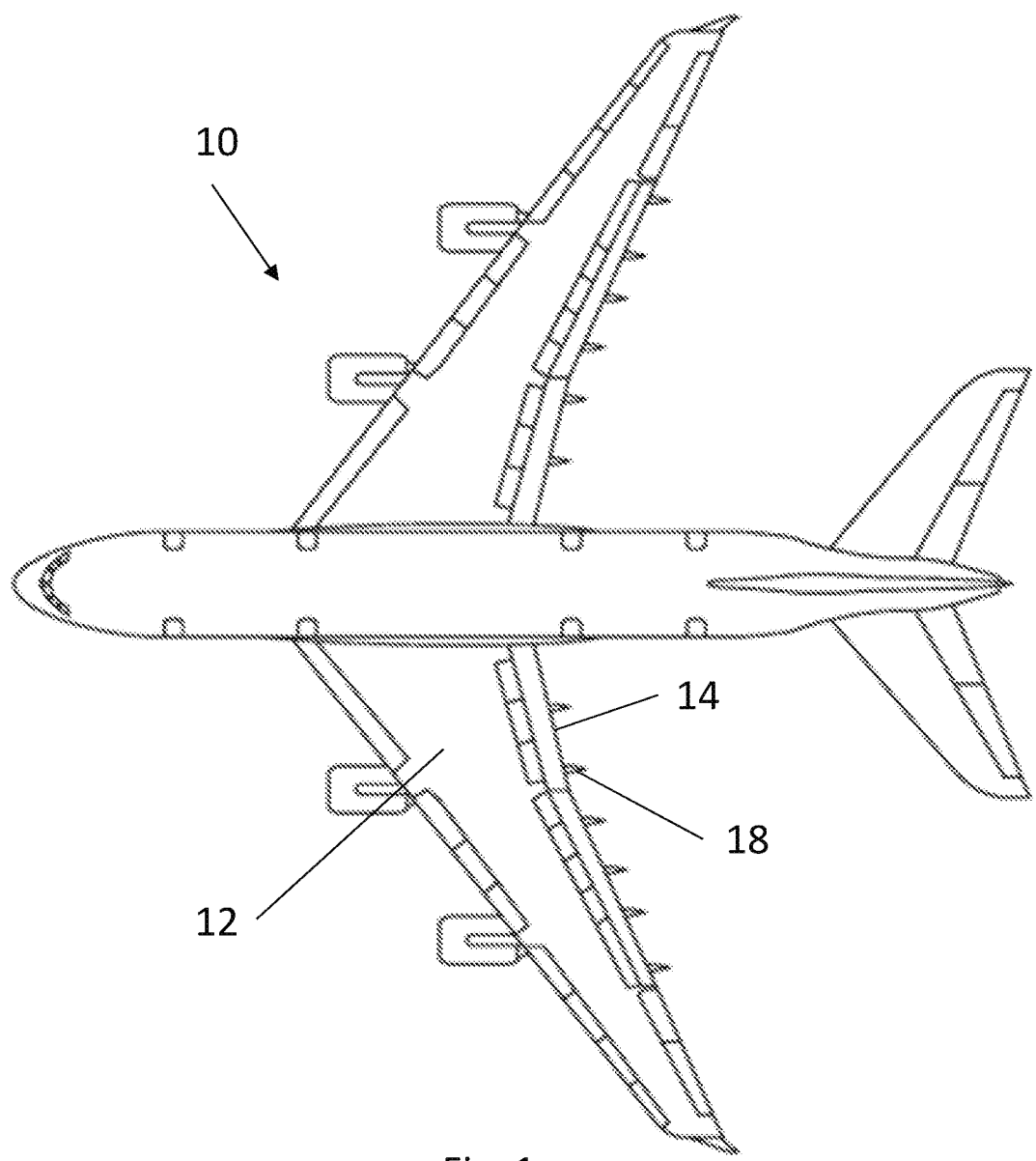
FIG. 1 shows a plan view of an aircraft according to a first embodiment of the invention.

FIG. 1 shows a plan view of an aircraft 10 comprising first and second swept aircraft wings 12 attached a fuselage. Each aircraft wing 12 comprises a number of flight control surfaces 14, in this case located at the trailing edge of the aircraft wing 12. Elements common to figures have the same reference numerals in the accompanying figures. Each of the flight control surfaces 14 are mechanically connected to at least one actuator 16, the actuator 16 at least partially extending from the upper or lower wing skin of the aircraft wing 12, with a fairing 18 covering the exposed part of the actuator 16.

Figure 2:
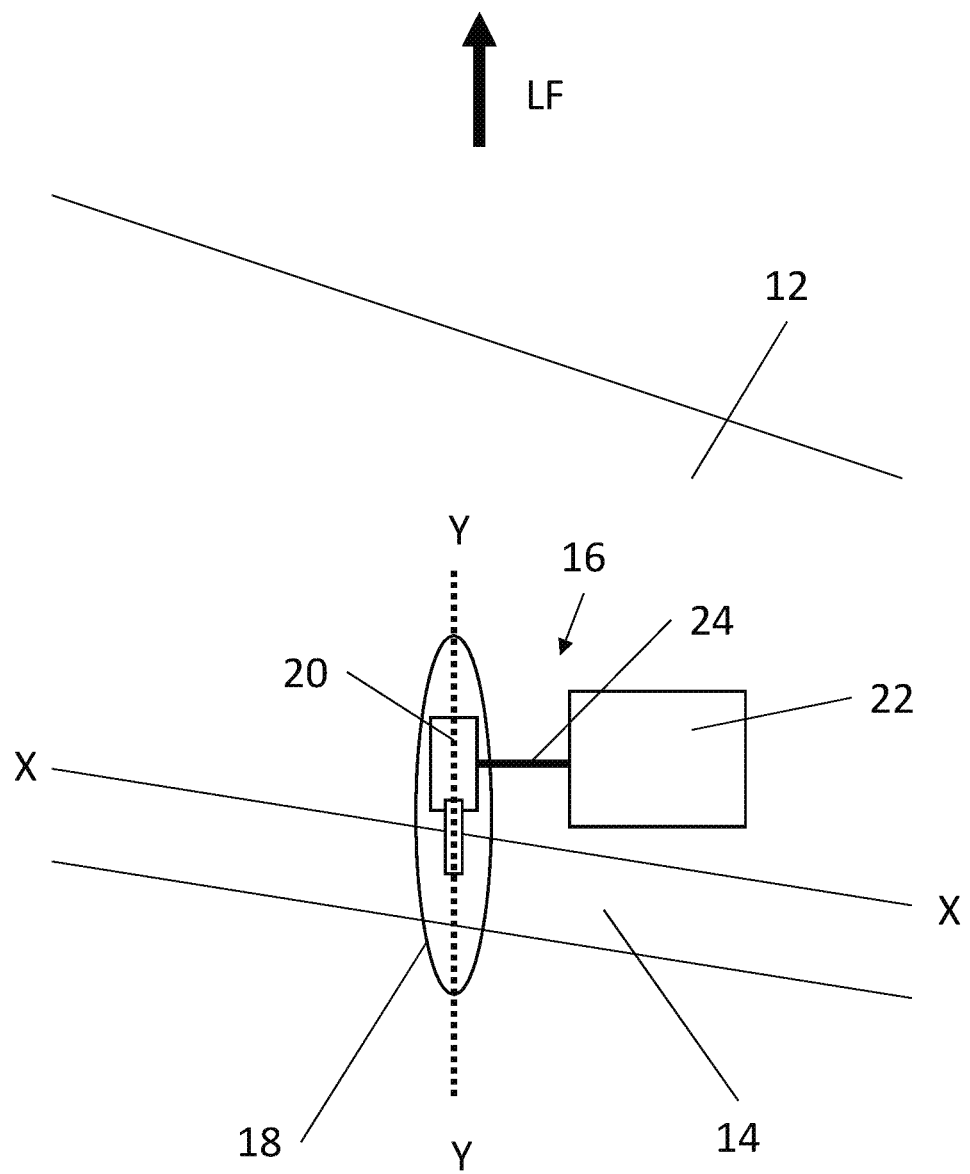
FIG. 2 shows schematic plan view of part of an aircraft wing according to a second embodiment of the invention.
Figure 3:
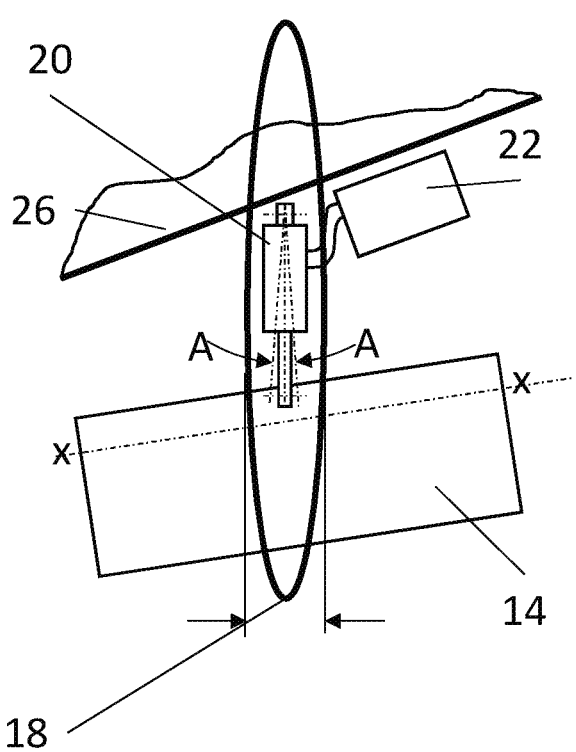
FIG. 3 shows the embodiment of FIG. 2 with additional markings showing the range of motion of the actuator.

FIGS. 2 and 3 show a cut-away section of the aircraft wing 12. A single actuator 16 is shown connected to the flight control surface 14, but the skilled person will appreciate that more than one actuator 16 may be connected to, and control, the flight control surface 14. The line of flight LF is indicated by the arrows LF. The line of flight LF may be parallel to a longitudinal axis of the fuselage of the aircraft. The flight control surface 14 has a hinge line XX. The hinge line XX is non-perpendicular, e.g., oblique, to the line of flight LF.

Figure 5:
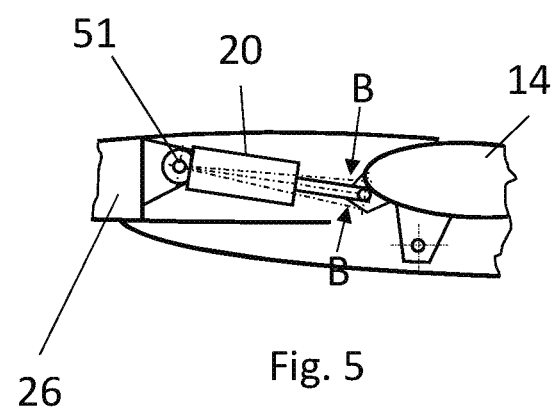
FIGS. 5 and 6 show side views of the embodiments shown in FIGS. 3 and 4 respectively.

The actuator 16 is a split hydraulic actuator, and comprises an actuator arm 20 which is connected to an actuator control unit 22. The connection between the actuator arm 20 and the actuator control unit 22 comprises at least one hydraulic pipeline 24. The actuator control unit 22 comprises a pump, a reservoir, solenoids, and an electronic control unit arranged to receive control commands for the actuator. The actuator control unit 22 is arranged in the main body of the aircraft wing 12 such that it is not necessary to provide any fairing to cover the actuator control unit 22. Therefore, the actuator control unit 22 does not affect the aerodynamic efficiency of the aircraft wing 12. The actuator arm 20 is connected to a first point on the aircraft wing, for example a spar 26, and a second point on the flight control surface 14. The actuator arm 20 has a longitudinal axis YY. The longitudinal axis YY is not perpendicular to the hinge line XX of the flight control surface 14. Instead, the longitudinal axis YY of the actuator arm 20 is substantially aligned with the line of flight LF, wherein substantially aligned refers to the longitudinal axis YY of the actuator arm being within five (5), ten (10) or fifteen (15) degrees of the line of flight LF. In order to allow for the non-perpendicular alignment, e.g., oblique alignment, of the actuator arm 20 with the flight control surface 14, it is necessary that the actuator arm 20 may move in a first and second plane. Such movement can be seen in FIG. 3, where the potential side to side movement of the actuator arm 20 is indicated by the arrows AA. Side to side movement will be understood by the skilled person to be movement in an approximately horizontal plane when the aircraft is on the ground in a normal orientation. A further plane of movement is shown in FIG. 5, where up and down movement of the actuator arm 20 is indicated by the arrows BB. Up and down movement will be understood by the skilled person to be movement in an approximately vertical plane when the aircraft is on the ground in a normal configuration. The up and down movement is approximately perpendicular to the side to side movement. In order to allow such movement, the attachment points at the aircraft wing and flight control surface may comprise spherical bearing and/or a bolt and pin arrangement, such as that shown in FIGS. 5 and 6 by reference numeral 51. The skilled person will appreciate that various other different connection arrangements may be used to provide the required non-planar movement. In the present arrangements, those two planes are up and down, and side to side, with those terms being defined when the aircraft is normally oriented on the ground. The side to side and up and down movement may also be defined with reference to the plane in which the aircraft wing is located, for example if the aircraft wing is angled non-parallel with the ground when the aircraft is on the ground. As some amount of side to side movement of the actuator arm 20 is required, then there will be a small deviation of the longitudinal axis YY from the line of flight LF. Such movement is indicated in FIG. 3 by the arrows AA. For example, the deviation from the longitudinal axis may be up to ±5 degrees, ±10 degrees, or ±15 degrees. However, the skilled person will appreciate that the deviation will not be so great as to orient the actuator arm 20 perpendicular to the hinge line XX, as otherwise the arrangement would not be able to provide a smaller fairing than in the prior art arrangements. The up and down movement may also range from ±5 degrees, ±10 degrees, or ±15 degrees during actuation of the actuator.

In order compensate for the non-planar movement of the actuator arm 20, it may be necessary to adapt the hydraulic pipe 24. For example, the hydraulic pipe 24 may be coiled, ribbed, or connected between the actuator arm 20 and actuator control unit 22 by two-dimensional (2D) swivel joints.

Figure 4:
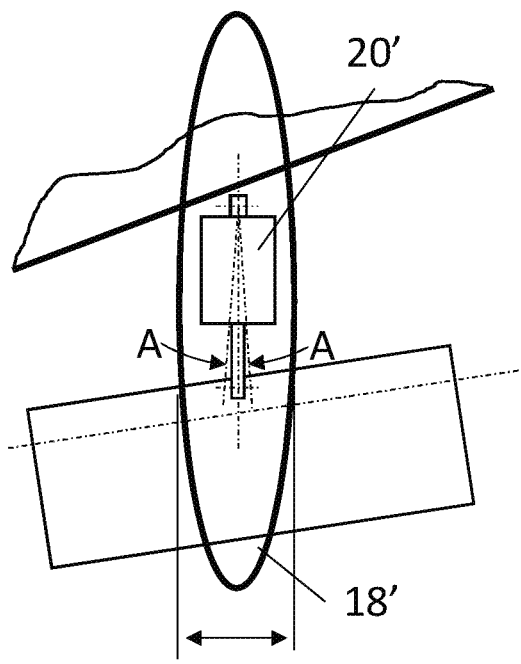
FIG. 4 shows a schematic plan view of part of an aircraft wing according to a third embodiment of the invention.
Figure 6:
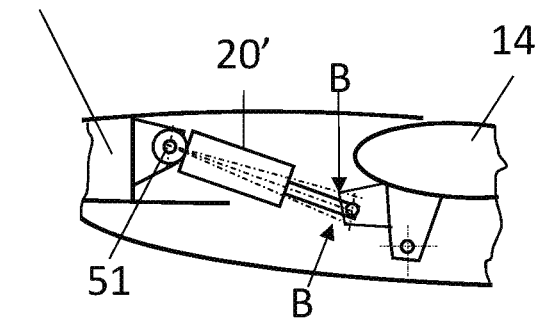

FIGS. 4 and 6 show an alternative arrangement to that shown in FIGS. 3 and 5. In this case, a single unit actuator 20' is provided, with a fairing 18' covering the single unit actuator 20'. The single unit actuator 20' includes the actuator control unit which in FIGS. 3 and 5 is provided as a remote unit 22, located away from the actuator 20. The other elements of the embodiment are similar to those shown in FIGS. 2, 3, and 5. The main difference is that the provision of a single unit actuator 20' requires a larger fairing 18' to cover the actuator 20'. The fairing 18' may be larger in both the horizontal cross-section, and vertical cross-section, with a deeper wing box and/or fairing required to house the larger actuator 20'.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. An aircraft including a swept aircraft wing comprising:
a movable flight control surface with a hinge line non-perpendicular to a longitudinal axis of a fuselage of the aircraft;
an actuator arm configured to actuate the movable flight control surface, wherein the actuator arm comprises a longitudinal axis substantially aligned with the longitudinal axis of the fuselage of the aircraft, and the actuator arm extends at least partially from an outer surface of the aircraft wing, and
a fairing mounted to the outer surface of the aircraft wing and at least partially covering the actuator arm,
wherein the actuator arm comprises a first pivotal connection to a main body portion of the aircraft wing, and a second pivotal connection to the movable flight control surface,
wherein the first pivotal connection and/or the second pivotal connection is configured for rotary movement of the actuator arm in a first plane and in a second plane perpendicular to the first plane,
wherein at least one of the first pivotal connection and the second pivotal connection is configured such that the actuator arm is moveable at least five degrees with respect to a line parallel to the longitudinal axis of the axis of the fuselage in both a first plane and a second plane perpendicular to the first plane, and
wherein the actuator arm moves at least five degrees with respect to both the first plane and the second plane while actuating movement of the flight control surface.

2. The aircraft as claimed in claim 1, wherein the actuator arm is arranged for non-planar movement with respect to the moveable flight control surface.

3. The aircraft according to claim 2, wherein at least one of the first pivotal connection and the second pivotal connection is configured such that the rotary movement includes pivoting longitudinal axis of the actuator arm at least ten degrees with respect to the first plane and at least ten degrees with respect to the second plane.

4. The aircraft as claimed in claim 1, wherein the actuator arm is connected to an actuator control unit.

5. The aircraft as claimed in claim 4, wherein the actuator control unit is located physically away from the actuator arm, and linked only by one or more control elements.

6. The aircraft as claimed in claim 4, wherein the actuator control unit is located within the aircraft wing.

7. The aircraft as claimed in claim 1, wherein the moveable flight control surface extends from a leading edge of the aircraft wing.

8. The aircraft as claimed in claim 1, wherein the moveable flight control surface extends from a trailing edge of the aircraft wing.

9. The aircraft as claimed in claim 8, wherein the moveable flight control surface is a flap, aileron, or flaperon.

10. The aircraft as claimed in claim 1, wherein the actuator arm is arranged to rotate and/or extend the moveable flight control surface about or from the hinge line.

11. The aircraft according to claim 1, wherein at least one of the first pivotal connection and the second pivotal connection is configured such that the rotary movement pivots a longitudinal axis of the actuator arm at least ten degrees from the line parallel to the longitudinal axis of a fuselage of the aircraft.

12. The aircraft according to claim 1, wherein the fairing has a longitudinal axis substantially aligned with the longitudinal axis of a fuselage of the aircraft.

13. A swept aircraft wing comprising:

a movable flight control surface which moves with respect to a hinge line, wherein the hinge line is non-perpendicular to a longitudinal axis of a fuselage attached to the swept aircraft wing;

an actuator arm configured to actuate the moveable flight control surface, wherein the actuator arm comprises a longitudinal axis substantially parallel to the longitudinal axis of the fuselage attached to the swept aircraft wing, wherein the actuator arm extends at least partially from an outer surface of the aircraft wing, and a fairing arranged on the outer surface of the swept aircraft wing and at least partially covering the actuator arm, wherein the actuator arm is pivotally attached by a first pivotal connection to a main body portion of the aircraft wing, and the actuator arm is pivotally attached by a second pivotal connection to the movable flight control surface, wherein the first pivotal connection and/or the second pivotal connection is configured for rotary movement of the actuator arm in a first plane and in a second plane perpendicular to the first plane, wherein at least one of the first pivotal connection and the second pivotal connection is configured such that an axis of the actuator arm is moveable at least five degrees with respect to a line parallel to the longitudinal axis of the fuselage in both a first plane and a second plane perpendicular to the first plane, and wherein the actuator arm moves at least five degrees with respect to both the first plane and the second plane while actuating movement of the flight control surface.

14. An aircraft wing assembly comprising:

a swept main aircraft wing;

a flight control surface mounted to a leading or trailing edge of the swept main aircraft wing, and configured to move with respect to a swept hinge line of the swept main aircraft wing;

an actuator configured to move the flight control surface with respect to the swept hinge line, wherein the actuator includes a longitudinal axis oblique to the swept hinge line and substantially parallel to a longitudinal axis of a fuselage of the aircraft attached to the aircraft wing assembly, and a fairing mounted to an outer aerodynamic surface of the swept main aircraft wing and at least partially covering the actuator, wherein the actuator is pivotally attached by a first pivotal connection to the swept main aircraft wing, and the actuator is pivotally attached by a second pivotal connection to the flight control surface;

wherein the first pivotal connection and/or the second pivotal connection is configured for rotary movement of an actuator arm of the actuator in a first plane and in a second plane perpendicular to the first plane wherein at least one of the first pivotal connection and the second pivotal connection is configured such that an axis of the actuator arm is moveable at least five degrees with respect to the first plane and at least five degrees with respect to the second plane, and wherein the actuator arm moves at least five degrees with respect to both the first plane and the second plane while actuating movement of the flight control surface.

15. The aircraft according to claim 14, wherein at least one of the first pivotal connection and the second pivotal connection is configured such that the rotary movement of the actuator arm includes pivoting a longitudinal axis of the actuator arm at least five degrees with respect to the first plane and at least ten degrees with respect to the second plane.

* * * * *